UNITED STATES PATENT OFFICE.

JOHN W. HYATT, OF NEWARK, NEW JERSEY, ASSIGNOR TO THE CELLULOID MANUFACTURING COMPANY, OF NEW YORK, N. Y.

IMPROVEMENT IN PROCESSES OF MANUFACTURING, POLISHING, AND SEASONING SHEETS OF CELLULOID AND OTHER PLASTIC MATERIAL.

Specification forming part of Letters Patent No. 221,070, dated October 28, 1879; application filed September 3, 1879.

*To all whom it may concern:*

Be it known that I, JOHN W. HYATT, of Newark, in the county of Essex and State of New Jersey, have invented a new and useful Improvement in the Process of Manufacturing, Polishing, and Seasoning Sheets of Celluloid and other Plastic Material, of which the following is a specification.

The invention relates to an improved method or process of manufacturing, polishing, and seasoning sheets of celluloid or analogous material.

Heretofore sheets of celluloid have been planed from the slab or block and locked between frames and permitted to dry. The sheet has been securely held at its edges while drying, which has caused it to draw itself taut and straight across the frame, thus causing it to harden into a flat smooth sheet. Sheets of plastic composition have also been dried by being subjected to pressure between sheets or layers of absorbent material; but no one, so far as I am aware, has ever dried and polished a sheet or number of sheets at one operation.

In my improved process I take the green sheet of plastic material, and at once spread it upon a flat polished surface, preferably a surface of nickel-plated metal. Upon the upper side of the sheet I place a layer of paper, (preferably uncalendered and as smooth and soft as possible,) or felt, or other suitable material of an absorbent nature, about one-eighth of an inch in thickness. Upon this layer of absorbent material I place, if preferred, another similar polishing-plate, the polished side being up, upon which is laid another sheet of the celluloid or other material, and upon that is placed another layer of paper or other suitable absorbent material, and so on, as many sheets of celluloid or other plastic material as it may be desired to polish at one time being thus arranged between alternating layers of plates and absorbent material; or, if it is preferred, the plate may be polished on both sides and a sheet of the celluloid or other plastic material placed on each of these polished surfaces with layers of absorbent material above and below. The effect is the same when the sheets are arranged in this way as when they are placed between alternating layers of plates and absorbent material, as above described. After the sheets have been thus arranged the whole is placed in a hydraulic or other suitable press and subjected to a pressure of about one hundred and fifty tons on sheets having a surface of, say, five square feet, or about thirty tons on each square foot of surface, the whole being allowed to remain about twenty-four hours, (more or less, according to the thickness of the sheets,) the layers of paper or other absorbent material being changed for fresh ones, and the pressure repeated until the sheets are thoroughly dry.

The pressure will usually be continued under the conditions specified for three or four days, when the desired result will have been fully attained. The effect of the pressure upon the sheets arranged as they are is to cause the layers of absorbent sheets to take up the solvents that may be in the sheets, and at the same time to press the sheets against the polished side of the nickel-plated plate or other polishing-plate, thus drying the sheet and giving the side next to the plate a highly-polished surface. The sheet is thus effectually polished and dried at one operation.

The invention may be applied to sheets of any plastic material containing a volatile solvent, but is especially adapted to the treatment of sheets of the material known as "celluloid."

The sheets are manufactured in any manner of a thickness adapted to the purpose for which they are to be utilized and treated and manipulated as hereinbefore set forth.

The sheets of material polished and seasoned as hereinbefore described can be utilized in many ways, both in the manufacture of articles of usefulness and in the production of devices of an ornamental or artistic character. For example, after the sheet has been polished and seasoned any design, picture, or lettering may be applied to the polished surface in any appropriate manner by any means that may be desired, either by a press with type, or by a steel or copper plate, or by means of a stone, or in any other way. After the ink or coloring-matter has dried the surface which bears the design may be coated with a liquid solution of celluloid or other suitable analogous material.

The coating having been permitted to become partially dry the sheet may be subjected to pressure between a hard polished surface and absorbent material, the printed surface of the sheet being in contact with the polished surface, the sheet being pressed substantially as it is in the process of polishing and drying hereinbefore described. In this manner I am enabled to produce what is called a "steel-plate engraving," or a picture, or lettering, or print embedded, as it were, into the sheet of material. The polished surface of the sheet adds to the elegance of the engraving or picture, and when soiled can be cleansed with a dampened cloth without injury to the picture, which, consequently, does not require the protection of a glass.

In order to beautify and render more durable the sheets of polished celluloid, they may be cemented to a sheet of paper, cloth, or other suitable fabric or material by means of celluloid-cement, shellac, or other suitable cement, the whole being pressed and dried together. When the sheets of celluloid or analogous material treated in this manner are transparent, any figures, designing, or lettering that may be previously placed or printed upon the paper or other material will be observable through the polished sheet. Another manner of adding to the ornamental character of the sheets will be by applying a coating of celluloid-cement, shellac, or other suitable adhesive material to the reverse side of the polished sheet, and then brushing, sifting, or otherwise distributing upon this adhesive material bronze, gold-dust, or other material that will produce a desirable color or effect.

The method of finishing the coated surface may be practiced in a variety of ways. Thus the coat of celluloid may be applied upon wood or other suitable material and the polishing effected as hereinbefore set forth; or a coating of ordinary varnish applied to wood or other material may be in like manner effectively finished and polished.

What I claim as my invention, and desire to secure by Letters Patent, is—

1. The process of drying and polishing sheets of plastic material herein described, which consists in subjecting the sheets to pressure between a polished surface and a layer of absorbent material, substantially as set forth.

2. The process of drying and polishing sheets of plastic material herein described, which consists in subjecting the sheets to pressure between a polished surface of nickel-plate and a layer of absorbent material, substantially as set forth.

3. The process of drying, polishing, and seasoning herein described, which consists in subjecting the sheets to pressure between a polished surface and a layer of absorbent material, and removing the layers of absorbent material from time to time until the sheets are thoroughly dried and seasoned, substantially as set forth.

4. A process of finishing a sheet of plastic material having a design applied to it and protected by a coating of the material in which the coating is subjected to pressure in contact with a polished surface, substantially as set forth.

5. A process in which a sheet of material is dried and polished by means of absorbent and polished surfaces, which act contemporaneously upon the surfaces of the sheet, substantially as set forth.

In testimony that I claim the foregoing improvement in the process of manufacturing, polishing, and seasoning sheets of plastic material, as above described, I have hereunto set my hand this 4th day of August, 1879.

J. W. HYATT.

Witnesses:
ABRAHAM MANNERS,
JOHN H. STEVENS.